United States Patent [19]

Cohen et al.

[11] Patent Number: 5,719,207
[45] Date of Patent: Feb. 17, 1998

[54] SILICA REINFORCED RUBBER COMPOSITION AND TIRE WITH TREAD

[75] Inventors: Martin Paul Cohen, Fairlawn; John Pennington Lawrence, Hudson; Cheryl Ann Losey, Kent, all of Ohio

[73] Assignee: The Goodyear Tire & Rubber Company, Akron, Ohio

[21] Appl. No.: 617,245

[22] Filed: Mar. 18, 1996

[51] Int. Cl.$^6$ .............................. C08K 5/21; C08L 9/00; B60C 11/00

[52] U.S. Cl. .......................... 524/213; 524/571; 524/506; 152/209 R

[58] Field of Search ........................... 523/213; 524/571, 524/506; 152/209 R

[56] References Cited

U.S. PATENT DOCUMENTS

| | | | |
|---|---|---|---|
| 4,714,734 | 12/1987 | Hashimoto et al. | 525/105 |
| 4,756,353 | 7/1988 | Nordsiek et al. | 152/209 R |
| 5,165,990 | 11/1992 | Nakano | 525/132 |
| 5,409,969 | 4/1995 | Hamada | 523/213 |
| 5,412,024 | 5/1995 | Okada et al. | 525/333.3 |
| 5,447,971 | 9/1995 | Bergh et al. | 523/213 |

*Primary Examiner*—Karen A. Dean
*Attorney, Agent, or Firm*—Henry C. Young, Jr.

[57] ABSTRACT

The present invention relates to a silica reinforced rubber composition and to pneumatic tires having treads comprised of the silica reinforced rubber compositions.

The silica reinforced rubber composition comprises at least one elastomer, silica, a silica coupler, a silylating agent and, optionally, carbon black.

44 Claims, No Drawings

SILICA REINFORCED RUBBER COMPOSITION AND TIRE WITH TREAD

FIELD

This invention relates to rubber compositions which are quantitatively reinforced with silica. In one aspect, the rubber composition is comprised of rubber, particularly sulfur curable, or cured, rubber, reinforced with a combination of silica, silica coupling agent, silylating agent and, optionally, carbon black.

BACKGROUND

For various applications utilizing rubber which require high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires. The use of such reinforcing fillers for elastomers, including sulfur curable elastomers, is well known to those having skill in such art.

It is important to appreciate that, conventionally, carbon black is a considerably more effective reinforcing filler for rubber products, and particularly for rubber tire treads than silica if the silica is used without a coupling agent, or silica coupler as it may be sometimes referred to herein.

Often coupling agents are composed of a silane which has at least one first constituent component, or moiety, (such as a silane portion) capable of reacting with the silica surface and, also, an additional moiety capable of interacting with the rubber, particularly a sulfur vulcanizable rubber which contains carbon-to-carbon double bonds, or unsaturation. Usually the additional moiety is sulfur in a form of a polysulfide and particularly a polysulfide bridge between said first moieties. In this manner, then the coupler acts as a connecting bridge between the silica and the rubber and thereby enhances the rubber reinforcement aspect of the silica.

The rubber-reactive group component, namely the said additional moiety, of such coupler may be, for example, one or more of groups such as mercapto, amino, vinyl, epoxy, and sulfur groups, preferably a sulfur or mercapto moiety and more preferably sulfur in a form of a polysulfide as a polysulfide bridge between at least two of said first moieties.

Numerous of such coupling agents are taught for use in combining silica and rubber, such as, for example, silane coupling agents containing a polysulfide component, or structure such as, for example, trialkoxyorganosilane polysulfides, such as for example bis-(3-trialkoxysilylorgano) polysulfides, containing from about 2 to about 8 sulfur atoms in a polysulfide bridge such as, for example, bis-(3-triethoxysilylpropyl)tetrasulfide and/or trisulfide.

Various U.S. patents relating to silicas and silica reinforced tire treads include, for example, U.S. Pat. Nos. 3,451,458; 3,664,403; 3,768,537; 3,884,285; 3,938,574; 4,482,663; 4,590,052 and 5,089,554.

In one aspect, and in contrast to the aforesaid rubber reactive silica coupling agents, other silica-reactive materials might be utilized to interact with the silica which have only one constituent component, or moiety, and which is capable of reacting with the silica surface. Such materials are not readily reactive with the rubber so that they do not readily promote interaction between the silica and the rubber. Therefore, by itself, such material is not considered herein to enable the silica to satisfactorily reinforce the rubber.

The term "phr" if used herein, and according to conventional practice, refers to "parts of a respective material per 100 parts by weight of rubber, or elastomer".

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

SUMMARY AND PRACTICE OF THE INVENTION

In accordance with this invention, a rubber composition is provided which comprises (A) 100 parts by weight of at least one diene-based elastomer, (B) about 50 to about 100, optionally about 60 to about 90, phr particulate reinforcing filler composed of precipitated silica and carbon black, comprised of about 60 to about 100, alternatively about 60 to about 90, phr of precipitated silica which contains silanol groups thereon and correspondingly zero to about 10, alternatively zero to about 7 or about 3 to about 7, phr of carbon black, wherein the weight ratio of silica to carbon black is at least about 6/1 and alternatively, at least about 10/1, (C) at least one silica coupler having a moiety reactive with said silica and another moiety interactive with said elastomer(s), (D) about 0.5 to about 10, alternatively about 2 to about 6 phr of a silanol-reactive, trialkylsilyl functional group-containing silylating agent having the formula:

where X is a radical selected from at least one of the group consisting of:

(1) halogen radical selected from one of chlorine, bromine and iodine
(2) —NH—C=OR$_1$,
(3) —NR$_4$—A,
(4) —NH—C=ONH—A, and
(5) —N(R$_4$)$_2$ wherein R$_1$, R$_2$, R$_3$ and R$_4$ are individually selected from the group consisting of primary, secondary and tertiary alkyl radicals and alkaryl radicals having from 1 to 30, alternatively about 1 to about 3, carbon atoms, wherein R$_4$ is alternatively hydrogen, A is —SiR$_1$R$_2$R$_3$.

It is an important feature of this invention that a relatively highly silica loaded elastomer composition is provided which contains the silica-reactive, silylating agent together with the silica coupler rather than the silylating agent or silica coupler individually.

The term "silylating agent" conventionally relates to materials which are capable of reacting with an active hydrogen-containing substrate, for example, a silanol group (SiOH) on a silica surface for this invention, to introduce a silyl functional group to the substrate material, or silica surface for this invention.

The term "silylating agent" is used herein to mean the said trialkylsilyl functional group-containing material which can react, for example, with a silanol group (SiOH) on a silica surface to introduce the trialkylsilyl group onto the silica surface.

By the term "silica-reactive silylating agent", it is meant herein that the trialkylsilyl groups of the agent react with silanol groups at the silica surface and, thus, chemically combine with the silica.

A trialkylsilyl group from the silylating agent is, thus, placed on the silica surface in place of the hydrogen atom of the silanol group.

It is important that the alkoxysilane component of a silica coupler which contains alkoxysilane units also reacts with the silanol groups at the surface of the silica and thereby also chemically combines with the silica.

While it is recognized that both the silica coupler (the silane moiety of the coupler) and the silylating agent compete for the silanol groups on the silica surface, only the additional moiety of the silica coupler such as, for example, a polysulfide bridge, has reactivity with the diene-based elastomer.

Because both the alkoxysilane moiety of a silane-containing silica coupler and the trialkylsilyl moiety of the silylating agent are reactive with and, thus, compete for the silanol groups on the surface of the silica, it is important that the silylating agent be added to the silica concurrent with or subsequent to the silica coupler. As a result, while the precise mechanism, or result, may not be completely known, it is considered herein that the silylating agent exerts a synergistic benefit to the silica coupler, but does not replace its use. Such a synergistic benefit might be observed, for example, as improved performance as might be exemplified by higher 300 percent modulus values, reduced hysteresis as evidenced by hot rebound values and/or improved abrasion resistance as may be evidenced by DIN abrasion test, when using a combination of both of the silylating agent and the silica coupler in the silica reinforced elastomer composition, relative to the performance obtainable by using either the silylating agent or the silica coupler individually.

For the said silanol-reactive silylating agent, and for said $R_1$, $R_2$, $R_3$ and $R_4$, representative examples of primary alkyl radicals are those selected from at least one of methyl, ethyl, propyl, octyl, n-octadecyl, and n-hexadecyl radicals; representative examples of secondary alkyl radicals are those selected from at least one of isopropyl and sec-butyl radicals and representative examples of tertiary alkyl radicals are those selected from at least one of tert-butyl, and dimethylbutyl radicals.

It is the trialkylsilyl moiety of the silylating agent that is reactive with the surface of the precipitated silica which is usually the silanol groups on the surface of the silica.

Representative, although not intended to be limitative, of various silylating agents are, for example, trimethylsilyl diethyl amine, N,N'-bis(trimethylsilyl) urea, trimethyl chlorosilane, hexamethyl disilazane and monotrimethylsilyl acetamide.

In the practice of this invention, it has been observed that the addition of the aforesaid silica silylating agent to the rubber silica composition, which contains the silica coupler, results in not only improved processing characteristics for the silica reinforced elastomer composition, such as reduced viscosity, but also in improved cured elastomer composition performance properties such as, for example, abrasion resistance, tear strength and rebound.

Cured physical properties such as abrasion resistance, tear strength and rebound values may be simultaneously improved. This is considered herein to be beneficial because tire treads having such properties are anticipated herein to provide one or more of improved treadwear, rolling resistance and durability.

It is recognized that various silylating agents have hereinbefore been used for various purposes in various elastomeric compositions such as, for example, silica and carbon black reinforced rubber compositions with 5–50 phr of silica and 10–60 phr of carbon black. For example, see (Japanese patent publication abstract No. 5051484).

It is considered herein that this invention is a departure from such prior practice because the silica silylating agent containing a trialkylsilyl moiety is used in combination with a silica coupler, which contains a silane moiety, in a substantially silica reinforced (eg. at least 60 phr of silica and less than 10 phr of carbon black) rubber composition.

In one aspect, a synergistic performance has been observed when using both the said silylating agent and silica coupler which was not observed when using either of the silylating agent or silica coupler alone for a silica reinforced elastomer composition. Moreover, the synergistic effect seemed to be dependant upon using only a limited amount, or level, of the silylating agent.

While, in the practice of this invention various silica couplers can be used, one preferred coupler is a bis-(trialkoxysilylalkyl) polysulfide containing from about 2 to about 8 sulfur atoms in the polysulfide bridge an hereinbefore described. For example, the silica coupler can be bis-(3-triethoxysilylpropyl) tetrasulfide having an average of about 4 sulfur atoms in its polysulfide bridge or, in an alternative, a polysulfide having about 2 sulfur atoms in its polysulfide bridge.

Conventionally a weight ratio of silica coupler to silica is in a range of about 0.01/1 to about 0.25/1.

In practice, a molar ratio based on trialkylsilyl functionality of the silica silylating agent to silane functionality of the silica coupler in a range of about 0.1/1 to about 4/1 alternatively, a molar ratio of about 0.5/1 to about 3/1, is preferred.

In one aspect of the invention, the rubber composition contains a high level, or amount, of silica, namely at least about 50 phr as a dominant elastomer reinforcing pigment with less than 10 phr of carbon black as a secondary elastomer reinforcing material.

The rubber composition itself can also be provided as being a sulfur cured composition through vulcanization of the uncured elastomer composition. The sulfur curing is accomplished in a conventional manner, namely by curing under conditions of elevated temperature and pressure for a suitable period of time.

Further, and in accordance with this invention, a tire is provided having a tread of the rubber composition of this invention.

The said curatives for the process are curatives conventionally used for sulfur curable elastomers which typically include sulfur and one or more appropriate cure accelerators and sometimes also a retarder. Such curatives and use thereof for sulfur curable elastomer compositions are well known to those skilled in the art.

Further, sequential mixing processes for preparing sulfur curable rubber compositions in which elastomers and associated ingredients exclusive of curatives are first mixed in one or more sequential steps followed by a final mixing step for adding curatives are also well known to those skilled in the art.

In the practice of this invention, as hereinbefore pointed out, the rubber composition is comprised of at least one diene-based elastomer, or rubber. Such elastomers are typically selected from homopolymers and copolymers of conjugated dienes and copolymers of conjugated diene(s) and vinyl aromatic compound. Such dienes may, for example, be selected from isoprene and 1,3-butadiene and such vinyl aromatic compounds may be selected from styrene and alphamethylstyrene. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70–95 percent trans), low vinyl polybutadiene rubber (10–30 percent vinyl), medium vinyl polybutadiene rubber (30–50 percent vinyl) and high vinyl polybutadiene rubber (50–90 percent vinyl).

In one aspect, particularly for a tire tread, the rubber is preferably of at least two of diene based rubbers. For example, a combination of two or more rubbers is preferred such as cis 1,4-polyisoprene rubber (natural or synthetic, although natural is preferred), 3,4-polyisoprene rubber, styrene/isoprene/butadiene rubber, emulsion and/or solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about 30 weight percent bound acrylonitrile in the terpolymer.

Emulsion polymerization prepared styrene/butadiene/acrylonitrile terpolymer rubbers containing about 2 to about 40 weight percent bound acrylonitrile in the copolymer are also contemplated as diene based rubbers for use in this invention, particularly if used in combination with other diene-based elastomers.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR may be to promote a reduction in tire rolling resistance as a result of lower hysteresis when it is used in a tire tread composition.

The 3,4-polyisoprene rubber (3,4-PI) is considered beneficial for a purpose of promoting the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of promoting the tire tread's wear, or treadwear.

Such BR can be prepared, for example, by organic solution polymerization of 1,3-butadiene.

The BR may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of precipitated silica reinforcing filler namely, greater than about 50 phr, to contribute a reasonably high modulus, high abrasion resistance and resistance to tear for the cured rubber composition. The amount of the silica, as hereinbefore referenced, may be as low as about 50 parts per 100 parts rubber, but is preferably from about 60 to about 90 or even up to about 100 parts by weight.

Carbon black may be present in levels below about 10 phr or not at all. Carbon black is not intended to serve as a principal reinforcing filler in the elastomer compositions of this invention. Herein, the carbon black if used, is used primarily as a colorant where a black colored elastomer composition is desired and/or as a carrier for liquid additives for elastomer composition such as, for example, the silica coupler if it would otherwise be added to the elastomer composition in a liquid form.

The commonly employed siliceous pigments used in rubber compounding applications can be used as the silica in this invention, including pyrogenic and precipitated siliceous pigments (silica), although precipitated silicas are preferred.

The siliceous pigments preferably employed in this invention are precipitated silicas such as, for example, those obtained by the acidification of a soluble silicate, e.g., sodium silicate, generally exclusive of silica gels.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Zeosil 1165MP and silicas available from Degussa AG with, for example, designations VN2 and VN3, etc.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Low amounts of reinforcing type carbon blacks(s), for this invention, if used, are hereinbefore set forth.

It is to be appreciated that the silica coupler and/or the silica silylating agent, if in a liquid form, may be used in conjunction with a carbon black carrier, namely, pre-mixed with a carbon black prior to the addition to the rubber composition, and such carbon black is to be included in the aforesaid amount of carbon black accounted for in the rubber composition formulation.

Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr.

Often stearic acid is used in a relatively impure state and is commonly referred to in the rubber compounding practice as "stearic acid" and is so referred to in the description and practice of this invention.

Typical amounts of zinc oxide comprise about 2 to about 5 phr. Typical amounts of waxes comprise about 1 to about 5 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2, phr. In another embodiment, combinations of a primary and a secondary accelerator might be used with the secondary accelerator being used in amounts of about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of the prescribed silylating agent in combination with a silica coupler in a silica reinforced rubber composition.

The presence and relative amounts of the other additives, as hereinbefore described, are not considered to be an aspect of the present invention which is more primarily directed to the utilization of the prescribed silylating agent(s), required to be used in combination with a silica coupler, in a silica reinforced rubber composition.

The mixing of the rubber composition can be accomplished by methods known to those having skill in the rubber mixing art. For example, the ingredients are typically mixed in at least two stages, namely, at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica, silica coupler, silica silylating agent, and carbon black if used, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art.

The invention may be better understood by reference to the following examples in which the parts and percentages are by weight unless otherwise indicated.

EXAMPLE I

In this Example, the trialkylsilyl-containing silylating agent was evaluated as a component of compounding ingredients for a quantitatively silica reinforced elastomer composition.

Rubber compositions containing the materials set out in Table 1 were prepared in a Kobe™ internal mixer using two separate stages of addition (mixing), one non-productive mix stage and a productive mix stage to temperatures of 160° C. and 100° C. and times of 6 minutes and 2 minutes, respectively. The amount of silylating agent is listed as being "variable" in Table 1 and is more specifically set forth in Table 2.

In comparison with Sample 1, Samples 2 and 3, which were prepared with addition of 3 and 6 phr silylating agent, respectively, clearly show the processing advantages of lower compound viscosity, plus the cured property advantages in modulus, rebound and abrasion resistance. In particular, the tire tread performance indicator properties of Samples 2 and 3, which contain 3 and 6 phr of the silylating agent, are better than those of Sample 1, namely, the 300 percent modulus is higher and the abrasion weight loss is less, indicative of better treadwear potential, and the rebound is higher indicative of better (reduced) rolling resistance.

TABLE 1

| Non-Productive Mix Stage | |
|---|---|
| E-SBR[1] | 25 |
| IBR[2] | 45 |
| Cis 1,4-Polybutadiene[3] | 20 |
| NR[4] | 10 |
| Processing Oils, Waxes | 24.9 |
| Zinc Oxide | 2.5 |
| Fatty Acid | 3 |
| Antioxidants[5] | 3 |
| Silica[6] | 80 |
| Bis-(3-triethoxysilylpropyl) tetrasulfide[7] | 12.8 |
| N,N-bis (trimethylsilyl) urea[8] | variable |
| Productive Mix Stage | |
| Sulfur | 1.4 |
| Accelerators, sulfenamide and guanidine types | 3.7 |

1) Emulsion polymerization prepared styrene/butadiene copolymer rubber having a styrene content of about 40 percent and obtained from The Goodyear Tire & Rubber Company;

2) isoprene/butadiene copolymer rubber containing about 50 percent isoprene and having a Tg of about −43° C. obtained from The Goodyear Tire & Rubber Company;

3) cis 1,4-polybutadiene rubber obtained as Budene 1254 from The Goodyear Tire & Rubber Company;

4) natural cis 1,4-polyisoprene rubber;

5) of the phenylene diamine types;

6) Z1165MP from Rhone Poulenc;

7) a 50/50 blend or composite of bis-(3-triethoxysilylpropyl) tetrasulfide, said composite commercially available from Degussa GmbH as X50S. Technically, the tetrasulfide is understood to be an organosilane polysulfide as a composite, or mixture, in which the average polysulfide bridge contains about 3.5 to about 4 connecting sulfur atoms, although the mixture may contain such polysulfides with about 2 to about 8 connecting sulfur atoms;

8) silylating agent obtainable from Huls America, Inc.

TABLE 2

| Sample # | 1 | 2 | 3 |
|---|---|---|---|
| N,N'-bis (trimethylsilyl) urea, phr | 0 | 3 | 6 |
| Cured Physical Properties | | | |
| 300% Modulus, MPa | 10.1 | 11.7 | 11.8 |
| Rebound (100° C.) | 60 | 62 | 62 |
| DIN Abrasion Resistance, rel. wt. loss | 108 | 104 | 102 |
| Viscosity - Uncured (Mooney MS 1 + 1.5, 100° C.) | | | |
| Non-productive mixed elastomer composition | 98 | 78 | 72 |
| Productive mixed elastomer composition | 55 | 52 | 50 |

In particular, this Example shows that the silylating agent, N,N'-bis(trimethylsilyl) urea, as utilized in Samples 2 and 3, in conjunction with the silica coupler, can provide significant improvements.

For example, the processing of the elastomer composition of Samples 2 and 3, as compared to Control Sample 1, was improved as evidenced by the reduced uncured viscosities for both the non-productive mixed elastomer compositions and the productive mixed elastomer compositions.

Further, the 300 percent modulus, hot rebound and DIN abrasion resistance values were improved for Samples 2 and 3 as compared to Control Sample No. 1 which contained only the silica coupler without the silylating agent.

EXAMPLE II

Rubber compositions containing the materials set out in Table 3 and as described in Example I were prepared in a Kobe™ internal mixer using one non-productive mix stage and a productive mix stage, to temperatures of 160° C. and 100° C. and times of 8 minutes and 2 minutes, respectively. The amounts of both silica coupler and silylating agent are listed as variable in Table 3 and are more specifically set forth in Table 4.

Sample No. 7 which contains only the silylating agent at 6 phr and no silica coupler, when compared to Sample No. 4 which contains only silica coupler at 6.4 phr and no silylating agent, clearly shows much inferior cured physical properties, including 300 percent modulus, DIN abrasion resistance and room temperature rebound.

Sample No. 5, which contains the silylating agent at 6 phr in addition to silica coupler, exhibits superior cured physical properties such as DIN abrasion resistance, tear strength and room temperature rebound which are indicative of improved tire performance such as durability, treadwear and rolling resistance.

Sample No. 6, in contrast, and which contains the silylating agent at 12 phr in addition to the silica coupler, has cured physical properties similar to those of Sample No. 4, and inferior to those of Sample No. 5. In particular, the abrasion resistance, room temperature rebound and tear strength of Sample No. 6 are inferior to those properties of Sample No. 5. This indicates that an upper limit exists for the beneficial synergistic activity of the silylating agent in conjunction with the silica coupler in a highly silica reinforced rubber composition.

Thus, the use of silylating agent without silica coupler is observed to be inferior in the physical property reinforcing characteristics which corresponds to the tire tread treadwear and rolling resistance performance indicators. The use of the silylating agent at 6 phr in combination with silica coupler provided what is considered herein to be synergistic improvements in the cured physical properties such as abrasion resistance, modulus ratio, rebound and tear resistance. The use of the silylating agent at 12 phr in combination with the silica coupler was observed to be no longer optimum and did not show the synergistic improvements seen for the lower level of silylating agent.

TABLE 3

| Non-Productive Mix Stage | |
|---|---|
| E-SBR | 25 |
| IBR | 45 |
| Cis 1,4-Polybutadiene | 20 |
| NR | 10 |
| Processing Oils, Waxes | 24.9 |
| Zinc Oxide | 2.5 |

TABLE 3-continued

| | |
|---|---|
| Fatty Acid | 3 |
| Antioxidants | 3 |
| Silica | 80 |
| Bis-(3-triethoxylsilylpropyl) tetrasulfide | variable |
| NN-bis (trimethylsilyl) urea | variable |
| Productive Mix Stage | |
| Sulfur | 1.4 |
| Accelerators, sulfenamide and guanidine types | 3.7 |

TABLE 4

| Sample # | 4 | 5 | 6 | 7 |
|---|---|---|---|---|
| N,N'-bis (trimethylsilyl) urea, phr | 0 | 6 | 12 | 6 |
| Bis-(3-triethoxypropyl) tetrasulfide, phr | 6.4 | 6.4 | 6.4 | 0 |
| Cured Physical Properties | | | | |
| 300% Modulus, MPa | 13.4 | 11.7 | 13.6 | 2.9 |
| Rebound (23° C.) | 40 | 42 | 40 | 34 |
| DIN Abrasion Resistance. rel. wt. loss | 103 | 92 | 97 | 125 |
| Strebler Tear Resistance, N | 54 | 79 | 52 | 141 |

While certain representative embodiments and details have been shown for the purpose of illustrating the invention, it will be apparent to those skilled in this art that various changes and modifications may be made therein without departing from the spirit or scope of the invention.

What is claimed is:

1. A rubber composition comprised of (A) 100 parts by weight of at least one diene-based elastomer, (B) about 50 to about 100 phr of particulate reinforcing filler composed of silica and optionally carbon black, composed of about 60 to about 100 phr of precipitated silica and correspondingly zero to about 10 phr of carbon black, wherein the weight ratio of silica to carbon black, if carbon black is used, is at least about 6/1, (C) at least one silica coupler having a moiety reactive with said silica and another moiety interactive with said elastomer(s), and (D) about 0.5 to about 10 phr of silica-reactive, trialkylsilyl functional group-containing silylating agent wherein the molar ratio based on silane functionality of the silylating agent to silica coupler is in a range of about 0.1/1 to 4/1; wherein said silylating agent has the formula:

$R_1R_2R_3Si—X$ where X is a radical selected from at least one of the group consisting of:

(1) halogen radical selected from one of chlorine, bromine and iodine,
(2) —NH—C=$OR_1$,
(3) —$NR_4$—A,
(4) —NH—C=ONH—A, and
(5) —N($R_4$)$_2$ wherein $R_1$, $R_2$, $R_3$ and $R_4$ are radicals individually selected from the group consisting of primary, secondary and tertiary alkyl radicals and alkaryl radicals having from 1 to 30 carbon atoms and wherein A is —$SiR_1R_2R_3$.

2. The rubber composition of claim 1 wherein said $R_1$, $R_2$, $R_3$ and $R_4$ radicals of said silylating agent component (D), are selected from at least one of the group consisting of methyl, ethyl, propyl, octyl, n-octadecyl, hexadecyl, isopropyl, sec-butyl, tert-butyl and dimethylbutyl radicals.

3. The rubber composition of claim 1 wherein said silylating agent component (D) is selected from at least one of the group consisting of trimethylsilyl diethyl amine, N,N'-bis(trimethylsilyl) urea, trimethyl chlorosilane, hexamethyl disilazane and monotrimethylsilyl acetamide.

4. The rubber composition of claim 1 wherein the silica coupler component (C) is a bis-(trialkoxysilylorgano) polysulfide containing from about 2 to about 8 sulfur atoms in the polysulfide bridge.

5. The rubber composition of claim 1 wherein the silica coupler component (C) is a bis-(trialkoxysilylalkyl) polysulfide.

6. The rubber composition of claim 4 wherein the silica coupler component (C) is a bis-(3-triethoxysilylpropyl) tetrasulfide.

7. The rubber composition of claim 1 wherein the diene based elastomer component (A) is selected from at least one of the group consisting of cis 1,4-polyisoprene rubber, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70-95 percent trans), low vinyl polybutadiene rubber (10-30 percent vinyl), medium vinyl polybutadiene rubber (30-50 percent vinyl), high vinyl polybutadiene rubber (50-90 percent vinyl), emulsion polymerization prepared styrene/butadiene/acrylonitrile terpolymer rubber and butadiene/acrylonitrile copolymer rubber.

8. The rubber composition of claim 1 wherein the silica of filler component (B) is a precipitated silica characterized by having a BET surface area in a range of about 50 to about 300 square meters per gram and a dibutylphthalate (DBP) absorption value in a range of about 150 to about 300 cc/100 gm.

9. A rubber composition comprised of (A) 100 parts by weight of at least one diene based one diene-based elastomer, (B) about 60 to about 90, phr particulate reinforcing filler composed of silica and optionally carbon black, composed of about 60 to about 90 phr of precipitated silica and about 3 to about 7 phr of carbon black, wherein the weight ratio of silica to carbon black is at least about 6/1, (C) at least one silica coupler having a moiety reactive with said silica and another moiety interactive with said elastomer(s), and (D) about 0.5 to about 10 phr of silica-reactive, trialkylsilyl functional group-containing silylating agent wherein the molar ratio based on silane functionality of the agent has the formula:

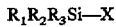

$R_1R_2R_3Si—X$ where X is a radical selected from at least one of the group consisting of:

(1) halogen radical selected from one of chlorine, bromine and iodine,
(2) —NH—C=$OR_1$,
(3) —$NR_4$—A,
(4) —NH—C=ONH—A, and
(5) —N($R_4$)$_2$ wherein $R_1$, $R_2$, $R_3$ and $R_4$ are radicals individually selected from the group consisting of primary, secondary and tertiary alkyl radicals and alkaryl radicals having from 1 to about 3 carbon atoms, and wherein A is —$SiR_1R_2R_3$.

10. The rubber composition of claim 9 wherein said $R_1$, $R_2$, $R_3$ and $R_4$ radicals of said silylating agent component (D) are selected from at least one of the group consisting of methyl, ethyl, propyl, octyl, n-octadecyl, n-hexadecyl, isopropyl sec-butyl radicals, tert-butyl and dimethylbutyl radicals.

11. The rubber composition of claim 9 wherein said silylating agent component (D) is selected from at least one of the group consisting of trimethylsilyl diethyl amine, N,N'-bis(trimethylsilyl) urea, trimethyl chlorosilane, hexamethyl disilazane and monotrimethylsilyl acetamide.

12. The rubber composition of claim 9 wherein the silica coupler component (C) is a bis-(trialkoxysilylorgano) polysulfide containing from about 2 to about 8 sulfur atoms in the polysulfide bridge.

13. The rubber composition of claim 10 wherein the silica coupler component (C) is a bis-(trialkoxysilylalkyl) polysulfide.

14. The rubber composition of claim 11 wherein the silica coupler component (C) is a bis-(3-triethoxysilylpropyl) tetrasulfide.

15. The rubber composition of claim 9 wherein the diene based elastomer component (A) is selected from at least one of the group consisting of cis 1,4-polyisoprene rubber, 3,4-polyisoprene rubber, styrene/butadiene copolymer rubbers, isoprene/butadiene copolymer rubbers, styrene/isoprene copolymer rubbers, styrene/isoprene/butadiene terpolymer rubbers, cis 1,4-polybutadiene rubber, trans 1,4-polybutadiene rubber (70-95 percent trans), low vinyl polybutadiene rubber (10-30 percent vinyl), medium vinyl polybutadiene rubber (30-50 percent vinyl), high vinyl polybutadiene rubber (50-90 percent vinyl), emulsion polymerization prepared styrene/butadiene/acrylonitrile terpolymer rubber and butadiene/acrylonitrile copolymer rubber.

16. The rubber composition of claim 9 wherein the silica of filler component (B) is a precipitated silica characterized by having a BET surface area in a range of about 50 to about 300 square meters per gram and a dibutylphthalate (DBP) absorption value in a range of about 150 to about 300 cc/100 gm.

17. A rubber composition comprised of (A) 100 parts by weight of at least one diene based one diene-based elastomer, (B) about 60 to about 90, phr particulate reinforcing filler composed of silica and optionally carbon black, composed of about 60 to about 90 phr of precipitated silica and about 3 to about 7 phr of carbon black, wherein the weight ratio of silica to carbon black is at least about 6/1, (C) at least one silica coupler having a moiety reactive with said silica and another moiety interactive with said elastomer(s), and (D) about 0.5 to about 10 phr of silica-reactive, trialkyl-silyl functional group-containing silylating agent wherein the molar ratio based on silane functionality of the silylating agent to silica coupler is in a range of about 0.1/1 to 4/1; wherein said silylating agent has the formula:

where X is a radical selected from at least one of the group consisting of:
 (1) halogen radical selected from one of chlorine, bromine and iodine,
 (2) —NH—C=$OR_1$,
 (3) —$NR_4$—A,
 (4) —NH—C=ONH—A, and
 (5) —N($R_4$)$_2$
wherein $R_1$, $R_2$, $R_3$ are radicals individually selected from the group consisting of primary, secondary and tertiary alkyl radicals and alkaryl radicals having from 1 to 3 carbon atoms, where $R_4$ is hydrogen, and wherein A is —Si$R_1R_2R_3$.

18. The rubber composition of claim 17 wherein said $R_1$, $R_2$ and $R_3$ radicals of said silylating agent component (D) are selected from at least one of methyl, ethyl, propyl, octyl, n-octadecyl, n-hexadecyl, isopropyl sec-butyl, tert-butyl and dimethylbutyl radicals.

19. The rubber composition of claim 17 wherein said silylating agent component (D) is selected from at least one of the group consisting of trimethylsilyl diethyl amine, N,N'-bis(trimethylsilyl) urea, trimethyl chlorosilane, hexamethyl disilazane and monotrimethylsilyl acetamide.

20. The rubber composition of claim 17 wherein the silica coupler component (C) is a bis-(trialkoxysilylorgano) polysulfide containing from about 2 to about 8 sulfur atoms in the polysulfide bridge.

21. The rubber composition of claim 18 wherein the silica coupler component (C) is a bis-(trialkoxysilylalkyl) polysulfide.

22. The rubber composition of claim 19 wherein the silica coupler component (C) is a bis-(3-triethoxysilylpropyl) tetrasulfide.

23. A tire having a tread of the rubber composition of claim 1.

24. A tire having a tread of the rubber composition of claim 2.

25. A tire having a tread of the rubber composition of claim 3.

26. A tire having a tread of the rubber composition of claim 4.

27. A tire having a tread of the rubber composition of claim 5.

28. A tire having a tread of the rubber composition of claim 6.

29. A tire having a tread of the rubber composition of claim 7.

30. A tire having a tread of the rubber composition of claim 8.

31. A tire having a tread of the rubber composition of claim 9.

32. A tire having a tread of the rubber composition of claim 10.

33. A tire having a tread of the rubber composition of claim 11.

34. A tire having a tread of the rubber composition of claim 12.

35. A tire having a tread of the rubber composition of claim 13.

36. A tire having a tread of the rubber composition of claim 14.

37. A tire having a tread of the rubber composition of claim 15.

38. A tire having a tread of the rubber composition of claim 16.

39. A tire having a tread of the rubber composition of claim 17.

40. A tire having a tread of the rubber composition of claim 18.

41. A tire having a tread of the rubber composition of claim 19.

42. A tire having a tread of the rubber composition of claim 20.

43. A tire having a tread of the rubber composition of claim 4.

44. A tire having a tread of the rubber composition of claim 22.

* * * * *